United States Patent
Kobayashi (10) Patent No.: US 9,963,147 B2
(45) Date of Patent: May 8, 2018

(54) IMAGE PROCESSING DEVICE (71) Applicant: HONDA MOTOR CO., LTD., Tokyo (JP)

(72) Inventor: Sachio Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/252,471

(22) Filed: Aug. 31, 2016

(65) Prior Publication Data
US 2017/0060136 A1    Mar. 2, 2017

(30) Foreign Application Priority Data
Sep. 1, 2015  (JP) .................. 2015-172094

(51) Int. Cl.
| G06K 9/00 | (2006.01) |
| B60W 30/16 | (2012.01) |
| B60W 30/12 | (2006.01) |
| G06T 7/73 | (2017.01) |

(52) U.S. Cl.
CPC .......... B60W 30/162 (2013.01); B60W 30/12 (2013.01); G06K 9/00798 (2013.01); G06T 7/73 (2017.01); G06T 2207/30256 (2013.01)

(58) Field of Classification Search
CPC .... B60W 30/162; B60W 30/12; B60W 30/16; G06K 9/00798; G06T 2207/30256
USPC ........................................................ 382/104
See application file for complete search history.

(56) References Cited

U.S. PATENT DOCUMENTS

| 6,813,370 B1* | 11/2004 | Arai .................. G01S 11/12 340/908.1 |
| 6,879,706 B2* | 4/2005 | Satoh ................ G06K 9/00798 340/907 |
| 9,545,922 B1* | 1/2017 | Sim ..................... B60W 30/12 |
| 2003/0195704 A1* | 10/2003 | Sekiguchi ............. B60W 30/16 701/301 |
| 2005/0159876 A1* | 7/2005 | Sugano ............. B60K 31/0008 701/96 |
| 2006/0239509 A1* | 10/2006 | Saito ................. G06K 9/00798 382/104 |
| 2012/0050074 A1* | 3/2012 | Bechtel .................... B60R 1/04 340/988 |
| 2015/0307095 A1* | 10/2015 | Aso ..................... B60W 30/12 701/1 |

FOREIGN PATENT DOCUMENTS

| JP | 2010-170255 A | 8/2010 |
| JP | 2010170255 A * | 8/2010 |

* cited by examiner

Primary Examiner — Van D Huynh
(74) Attorney, Agent, or Firm — Westerman, Hattori, Daniels & Adrian, LLP (57) ABSTRACT The image processing device includes a lane marking recognition section that recognizes left and right lane markings from a surroundings image captured by an imaging section, and a leading vehicle recognition section that recognizes a leading vehicle from the surroundings image. The lane marking recognition section determines that the left and right lane markings are a true lane marking pair in cases in which a width direction discrepancy, or a value based on the discrepancy, between a reference position between the left and right lane markings and a reference position of the leading vehicle is within a threshold value.

13 Claims, 3 Drawing Sheets

IMAGE PROCESSING DEVICE

CROSS REFERENCES TO RELATED APPLICATIONS

The present application claims priority under 35 U.S.C. § 119 to Japanese Patent Application No. 2015-172094, filed Sep. 1, 2015, entitled "Image Processing Device." The contents of this application are incorporated herein by reference in their entirety.

TECHNICAL FIELD

The present disclosure relates to an image processing device capable of recognizing left and right lane markings with high precision.

BACKGROUND

Japanese Unexamined Patent Application Publication No. 2010-170255 attempts to enable lane boundary lines to be detected with high precision in a lane boundary line detection device that detects lane boundary lines, which are boundaries of driving lanes in which a vehicle drives, from captured images ([0005], Abstract).

In Japanese Unexamined Patent Application Publication No. 2010-170255 (Abstract), departure warning processing performed when detecting lane boundary lines computes a degree of certainty representing a probability that the lane boundary line candidate is a lane boundary line based on the shape of each lane boundary line candidate, for lane boundary line candidates representing plural edge components running along the driving direction of the vehicle in the captured images (S320). Degree of certainties corresponding to lane boundary line candidates in the vicinity of a position of a leading vehicle, which represents a vehicle driving ahead of the vehicle, are then changed to higher values (S330, S340), and the lane boundary line candidate corresponding to the highest degree of certainty is identified as the lane boundary line (S380).

Determination as to whether or not a lane boundary line candidate is in the vicinity of the position of the leading vehicle (or a degree of certainty PPi based on this) is made based on the distance (an end section distance) between the lane boundary line candidate and either a left or right end section of the leading vehicle (the end section at the side closest to the lane boundary line candidate) (FIG. 5(b), [0042], [0043]).

As described above, the distance (end section distance) between the lane boundary line candidate and either the left or right end section of the leading vehicle (the end section at the side closest to the lane boundary line candidate) is employed in Japanese Unexamined Patent Application Publication No. 2010-170255 (FIG. 5(b), [0042], [0043]). In other words, a left lane boundary line is compared against a left end section of the leading vehicle, and a right lane boundary line is compared against a right end section of the leading vehicle, to make separate determinations of the left and right lane boundary lines in Japanese Unexamined Patent Application Publication No. 2010-170255.

Thus, a correct combination is sometimes not obtained in Japanese Unexamined Patent Application Publication No. 2010-170255. For example, when left and right lane boundary lines are determined separately, in cases in which erasure of old white lines was forgotten or there are remaining road repair markings or braking marks, there is a possibility that old white lines in positions that happen to have high reliability could be picked up. Moreover, in cases in which the technology of Japanese Unexamined Patent Application Publication No. 2010-170255 is employed during a traffic jam, the leading vehicle will be close to the vehicle, shortening the length of the white line that can be subject to recognition and lowering the recognition precision.

SUMMARY

The present application describes an image processing device capable of recognizing lane markings with high precision.

An image processing device according to the present disclosure includes: a lane marking recognition section that recognizes left and right lane markings from a surroundings image captured by an imaging section; and a leading vehicle recognition section that recognizes a leading vehicle from the surroundings image. The lane marking recognition section determines that the left and right lane markings are a true lane marking pair in cases in which a width direction discrepancy, or a value based on the discrepancy, between a reference position in-between the left and right lane markings and a reference position of the leading vehicle is within a threshold value. Lane markings can accordingly be recognized with high precision.

According to the present disclosure, the left and right lane markings are determined to be a true lane marking pair in cases in which a width direction discrepancy, or a value based on the discrepancy, between a reference position in-between the left and right lane markings and a reference position of the leading vehicle is within a threshold value. Thus, correct left and right lane marking pairs can be recognized with high precision.

The lane marking recognition section may find the width direction discrepancy for plural positions along a direction of travel of the vehicle. Moreover, the lane marking recognition section may determine that the left and right lane markings are a true lane marking pair in cases in which the total or an average value of the width direction discrepancies, or the width direction discrepancy at each of the plural positions, is within the threshold value. This enables lane marking pairs to be recognized with high precision by using the width direction discrepancies at the plural positions.

The lane marking recognition section may set the threshold value according to the distance between the left and right lane markings. This enables lane marking pairs to be recognized with high precision according to the lane width defined by the left and right lane markings.

BRIEF DESCRIPTION OF THE DRAWINGS

The advantages of the disclosure will become apparent in the following description taken in conjunction with the following drawings.

DETAILED DESCRIPTION

A. First Embodiment

A1. Configuration

A1-1. Overall Configuration

Figure 1:
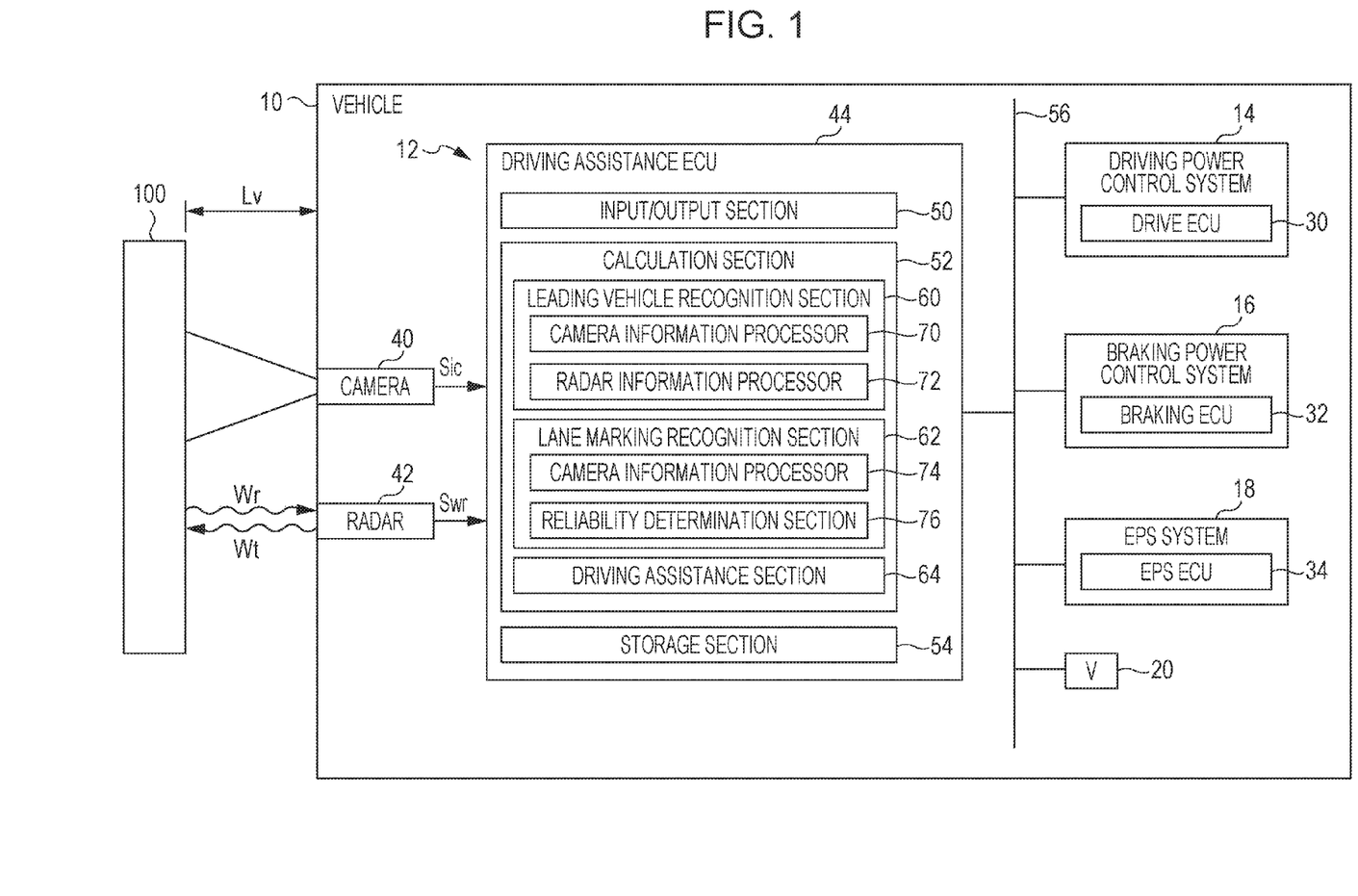
FIG. 1 is a block diagram illustrating a configuration of a vehicle installed with a driving assistance system including a driving assistance electronic control unit serving as an image processing device according to an embodiment of the present disclosure.

FIG. 1 is a block diagram illustrating a configuration of a vehicle 10 installed with a driving assistance system 12 provided with a driving assistance electronic control unit 44 (also referred to as a "driving assistance ECU 44" or an "ECU 44" below) serving as an image processing device according to a first embodiment of the present disclosure. In addition to the driving assistance system 12, the vehicle 10 also includes a drive power control system 14, a braking power control system 16, an electrical power steering system 18 (also referred to as an "EPS system 18" below), and a vehicle speed sensor 20.

The driving assistance system 12 detects various surrounding objects 100 (for example, other vehicles (including a leading vehicle 102 (FIG. 2A to FIG. 2C)) and pedestrians and walls, which are not illustrated) and lane markings 112$l$, 112$r$ (FIG. 2A to FIG. 2C) that appear around the vehicle 10. The driving assistance system 12 then uses the surrounding objects 100 and the lane markings 112$l$, 112$r$ to assist driving of the vehicle 10.

An electronic control unit 30 of the drive power control system 14 (referred to as a "drive ECU 30" or an "ECU 30" below) executes control of drive power of the vehicle 10. During drive power control, the drive ECU 30 controls the drive power of the vehicle 10 by controlling a non-illustrated engine or the like. The drive power control of the present embodiment includes automatic cruise control. Automatic cruise control is control that causes the vehicle 10 to drive such that a vehicle speed V (km/h) matches a target vehicle speed Vtar.

An electronic control unit 32 (referred to as a "braking ECU 32" or an "ECU 32" below) of the braking power control system 16 executes control of braking power of the vehicle 10. During braking power control, the braking ECU 32 controls braking power of the vehicle 10 by controlling a non-illustrated braking mechanism or the like.

An electronic control unit 34 (also referred to as an "EPS ECU 34" or an "ECU 34" below) of the EPS system 18 executes control of steering assistance. During steering assistance control, the EPS ECU 34 assists driver steering by controlling configuration elements of an electrical power steering device (such as an electrical motor, a torque sensor, and a steering angle sensor (none of which are illustrated)).

The vehicle speed sensor 20 detects the vehicle speed V of the vehicle 10, and outputs the detected vehicle speed V to the driving assistance system 12 or the like.

A1-2. Driving Assistance System 12

As illustrated in FIG. 1, in addition to the driving assistance ECU 44, the driving assistance system 12 includes a camera 40 and a radar 42.

A1-2-1. Camera 40

The camera 40 (imaging section) acquires an image Imc (also referred to as a "surroundings image Imc" or a "captured image Imc" below) of around the vehicle 10 (including the surrounding objects 100 and the lane markings 112$l$, 112$r$). A signal (referred to as an "image signal Sic" or a "signal Sic" below) corresponding to the image Imc is then output to the ECU 44. The signal Sic includes information Ic (also referred to as "camera information Ic" below) acquired by the camera 40. The detected objects 100 detected by the camera 40 are also referred to as "camera targets 100$c$" below.

Although a single camera 40 is employed in the present embodiment, a stereo camera may be configured by disposing two cameras 40 with left-right symmetry to each other. The camera 40 acquires images Imc at 15 frames or more (for example, 30 frames) per second. Although the camera 40 is a monochrome camera that primarily uses light having a wavelength in the visible light spectrum, a color camera or an infra-red camera may be employed. The camera 40 is, for example, disposed at a vehicle width direction central portion of a front section in the vehicle cabin of the vehicle 10 (for example, in the vicinity of the rear view mirror). Alternatively, the camera 40 may be disposed at a vehicle width direction central portion of a front bumper section of the vehicle 10.

A-1-2-2. Radar 42

The radar 42 outputs transmitted waves Wt, which are electromagnetic waves (millimeter waves here), to the exterior of the vehicle 10, and receives reflected waves Wr that are waves out of the transmitted waves Wt reflected back by the detected objects 100 (including, for example, pedestrians and other vehicles (the leading vehicle 102 (FIG. 2A to FIG. 2C)), neither of which are illustrated). Detection signals corresponding to the reflected waves Wr (referred to as "reflected wave signals Swr" or "signals Swr" below) are output to the ECU 44. The signals Swr include information Ir acquired by the radar 42 (also referred to as "radar information Ir" below). The detected objects 100 detected by the radar 42 are also referred to as "radar targets 100$r$" below.

The radar 42 is disposed at the front side of the vehicle 10 (for example, on the front bumper and/or front grill). In addition to the front side, or instead of the front side, the radar 42 may be disposed at the rear side (for example, on a rear bumper and/or rear grill) or at a lateral side (for example, on a lateral side of the front bumper) of the vehicle 10. A sensor such as a laser radar or an ultrasonic wave sensor may be employed instead of the radar 42 that outputs millimeter waves.

The distance Lv to a detected object 100, the type of detected object 100, and the like can be found using at least one out of the camera 40 or the radar 42.

A1-2-3. Driving Assistance ECU 44

The driving assistance ECU 44 controls the driving assistance system 12 overall, and includes an input/output section 50, a calculation section 52, and a storage section 54, as illustrated in FIG. 1.

Image signals Sic from the camera 40 and reflected wave signals Swr from the radar 42 are supplied to the driving assistance ECU 44 via the input/output section 50. Moreover, the driving assistance ECU 44 communicates with the drive ECU 30, the braking ECU 32, and the EPS ECU 34 via the input/output section 50 and a communication line 56. The input/output section 50 is provided with a non-illustrated A/D converter circuit that converts inputted analog signals into digital signals.

The calculation section 52 makes calculations based on the signals Sic, Swr from the camera 40 and the radar 42, respectively, and based on the vehicle speed V from the vehicle speed sensor 20. Based on the calculation results, the calculation section 52 generates signals for the driving ECU 30, the braking ECU 32, and the EPS ECU 34.

As illustrated in FIG. 1, the calculation section 52 includes a leading vehicle recognition section 60, a lane marking recognition section 62, and a driving assistance section 64. The recognition sections 60, 62 and the assistance section 64 are implemented by executing a program stored in the storage section 54 by using a processor or CPU. The program may be supplied from an external source via a non-illustrated wireless communication device (such as a mobile phone, or a smartphone). Some of the program may also be configured using hardware (circuit components).

The leading vehicle recognition section 60 recognizes the leading vehicle 102 based on the camera information Ic from the camera 40 and the radar information Ir from the radar 42. The leading vehicle recognition section 60 includes a camera information processor 70 that processes the camera information Ic, and a radar information processor 72 that processes the radar information Ir.

The camera information processor 70 recognizes the leading vehicle 102 based on the camera information Ic from the camera 40. The camera information processor 70 employs, for example, pattern matching when recognizing the leading vehicle 102. The radar information processor 72 recognizes the leading vehicle 102 based on the radar information Ir from the radar 42. The radar information processor 72 employs, for example, a size and a movement speed of the detected object 100 when recognizing the leading vehicle 102. A position, type, etc. of the leading vehicle 102 may be recognized using a combination of the processing by the camera information processor 70 and the radar information processor 72 (or the camera target 100c and the radar target 100r).

The lane marking recognition section 62 recognizes the lane markings 112*l*, 112*r* based on the camera information Ic from the camera 40 and information Ilv (also referred to as a "leading vehicle information Ilv" below) of the leading vehicle 102 recognized by the leading vehicle recognition section 60. The lane marking recognition section 62 includes a camera information processor 74 that processes the camera information Ic, and a reliability determination section 76 that determines the reliability Dc of the lane markings 112*l*, 112*r*.

The camera information processor 74 recognizes the left and right lane markings 112*l*, 112*r* (candidates) based on the camera information Ic from the camera 40. The camera information processor 74 employs, for example, pattern matching when recognizing the lane markings 112*l*, 112*r*. The reliability determination section 76 determines a reliability D of the lane markings 112*l*, 112*r* recognized by the camera information processor 74, and determines whether the lane markings 112*l*, 112*r* are a true pair based on the reliability D.

The driving assistance section 64 assists driving of the vehicle 10 based on the leading vehicle information Ilv from the leading vehicle recognition section 60 and lane markings 112*l*, 112*r* information Ilm (also referred to as a "lane markings information Ilm" below) recognized by the lane marking recognition section 62. Here, driving assistance may include, for example, one or both out of lane keep assist system (LKAS) control and road departure mitigation (RDM) control. Description of the LKAS control and the RDM control is given below.

The storage section 54 is configured by, for example, random access memory (RAM) that stores imaging signals converted into digital signals, temporary data entailed by various types of calculation processing, etc., and read only memory (ROM) that stores executable programs, tables, plots, etc.

A2. Driving Assistance Control

A2-1. Overview

The driving assistance control of the present embodiment includes lane marking recognition control and vehicle control. The lane marking recognition control recognizes the lane markings 112*l*, 112*r*. The vehicle control uses the lane markings 112*l*, 112*r* and the like recognized by the lane marking recognition control to control the operation of the vehicle 10.

A2-2. Lane Marking Recognition Control

A2-2-1. Basic Approach

Figure 2A:
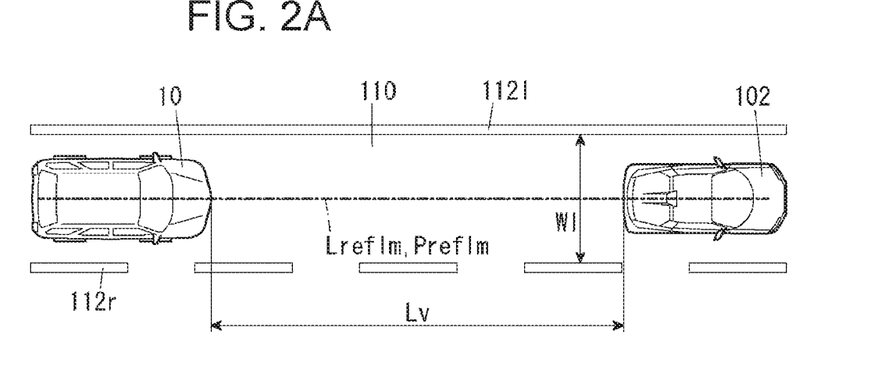
FIG. 2A, FIG. 2B, and FIG. 2C are first, second, and third explanatory diagrams for explaining lane marking recognition control of the embodiment.
Figure 2B:
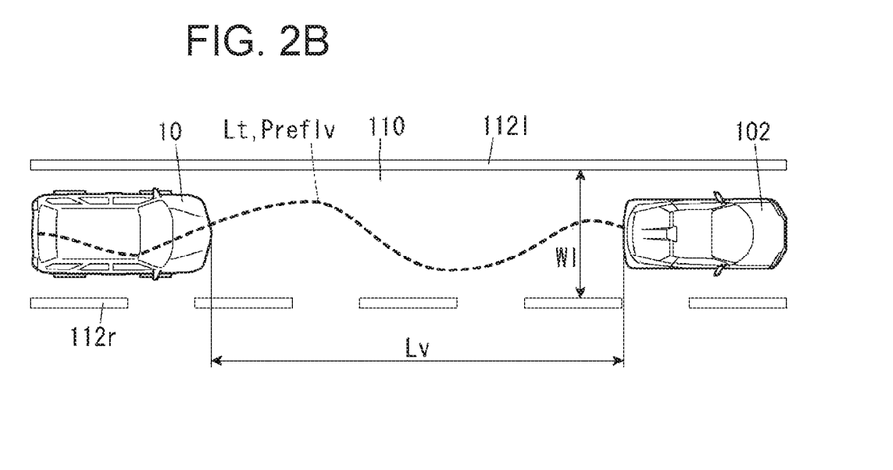
Figure 2C:
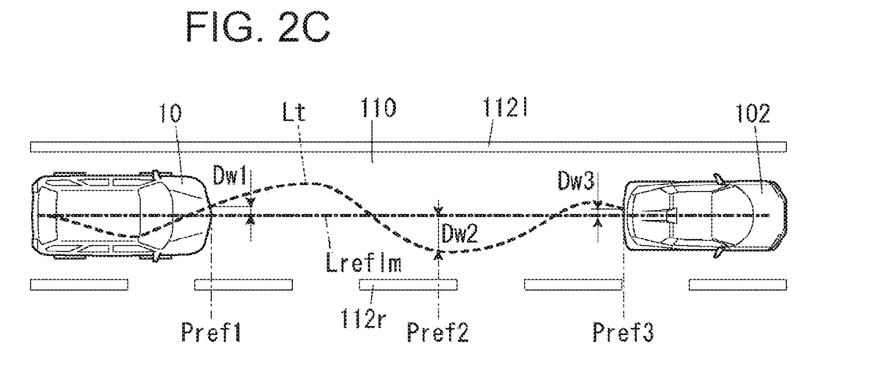

FIG. 2A, FIG. 2B, and FIG. 2C are first, second, and third explanatory diagrams for explaining lane marking recognition control of the present embodiment. FIG. 2A, FIG. 2B, and FIG. 2C illustrate a state in which the vehicle 10 and the leading vehicle 102 are driving along a driving lane 110. The driving lane 110 is identified using the lane markings 112*l*, 112*r* on the left and right of the vehicle 10 or the leading vehicle 102.

As illustrated in FIG. 2A, in the present embodiment, the driving assistance ECU 44 identifies a reference line Lreflm (or plural reference positions Preflm configuring the reference line Lreflm) between the lane markings 112*l*, 112*r* based on the camera information Ic. In the present embodiment, the reference line Lreflm is a central line equidistant from the lane markings 112*l*, 112*r*. Alternatively, a line offset to the left or right from the central line by a specific distance may serve as the reference line Lreflm.

As illustrated in FIG. 2B, in the present embodiment, the ECU 44 identifies a driving course Lt of the leading vehicle 102 (or plural reference positions Preflv that configure the driving course Lt). In the present embodiment, the driving course Lt (or the reference positions Preflv) are set to correspond to the left-right center of the leading vehicle 102. Alternatively, the driving course Lt may be set to correspond to a position offset to the left or right from the center of the leading vehicle 102 by a specific distance. The reference positions Preflm are also referred to as lane marking reference positions Preflm, and the reference positions Preflv are also referred to as leading vehicle reference positions Preflv, below.

Moreover, as illustrated in FIG. 2C, in the present embodiment, the ECU 44 computes width direction discrepancies Dw (Dw1, Dw2, Dw3) between the reference line Lreflm (or the reference positions Preflm) in-between the lane markings 112*l*, 112*r*, and the driving course Lt (or the reference positions Preflv) of the leading vehicle 102, for three reference positions Pref (Pref1, Pref2, Pref3).

Here, the reference positions Pref (also referred to as "discrepancy reference positions Pref" below) indicate coordinates in the direction of travel (X direction), and do not include a width direction (Y direction) coordinate. However, when the driving lane 110 is a curved road, the direction of travel may be defined as a curved line for computing the width direction discrepancies Dw along the curved road, rather than a simple straight line.

Here, the discrepancy reference position Pref1 corresponds to a position Phv of the vehicle 10 (also referred to as a "vehicle position Phv" below). The vehicle position Phv is, for example, set to a central position at the very front of the vehicle 10. The discrepancy reference position Pref 2 corresponds to a control target position Ptar. The control target position Ptar is, for example, a position that represents a location at which the vehicle 10 should reach the center of the driving lane 110 when the vehicle 10 is caused to move to the center of the driving lane 110 under LKAS control. The control target position Ptar may be changed according to the vehicle speed V (and the target time corresponding to the vehicle speed V). The discrepancy reference position Pref3 corresponds to the position Ply of the leading vehicle 102 (also referred to as a "leading vehicle position Plv" below). The leading vehicle position Ply is, for example, set to a central position at the very rear of the leading vehicle 102.

The ECU 44 then determines the reliability Dc of the lane markings 112*l*, 112*r* or the driving lane 110 using the discrepancies Dw. The ECU 44 then assists driving using the lane markings 112*l*, 112*r* or the driving lane 110 when the reliability Dc is high, but does not employ the lane markings 112*l*, 112*r* or the driving lane 110 for assisting driving when the reliability Dc is low.

Note that in the lane marking recognition control, it is sufficient that a coordinate in the front-rear direction (X direction) and a coordinate in the left-right direction (Y direction) of the vehicle 10 can be identified, as may be understood from FIG. 2A to FIG. 2C. Thus, in the lane marking recognition control, coordinates in the height direction of the vehicle 10 (the Z direction) may be omitted.

A2-2-2. Specific Processing

Figure 3:
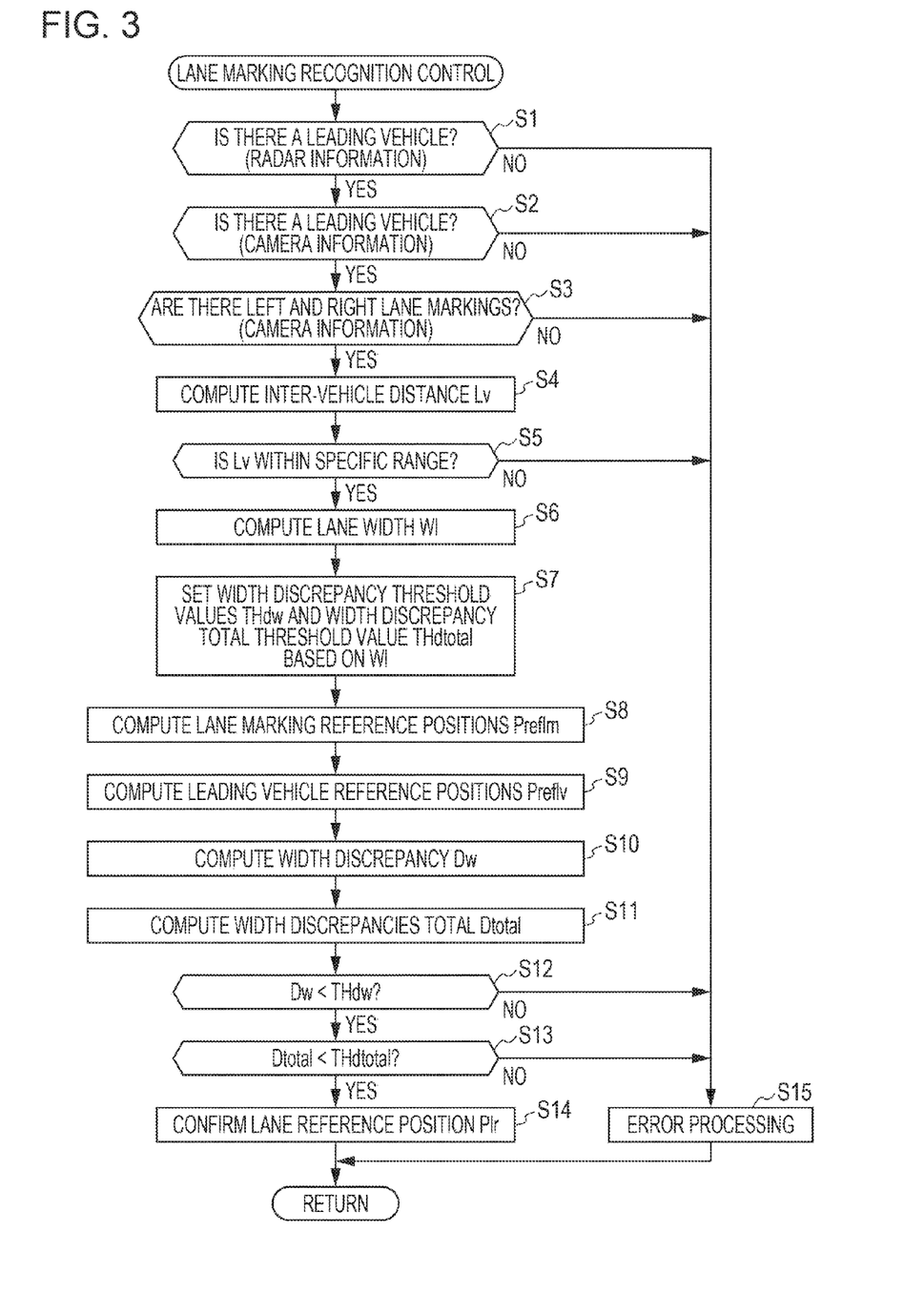
FIG. 3 is a flowchart of the lane marking recognition control of the embodiment.

FIG. 3 is a flowchart of lane marking recognition control of the present embodiment. At step S1 of FIG. 3, the driving assistance ECU 44 (the radar information processor 72) determines whether or not the leading vehicle 102 is present based on the radar information Ir. In cases in which the leading vehicle 102 is present based on the radar information Ir (S1: YES), processing proceeds to step S2.

At step S2, the ECU 44 (the camera information processor 70) determines whether or not the leading vehicle 102 is present based on the camera information Ic. In cases in which the leading vehicle 102 is present based on the camera information Ic (S2: YES), processing proceeds to step S3. The presence or absence of the leading vehicle 102 may be determined by combining the camera information Ic and the radar information Ir (in other words, steps S1 and S2 may be combined).

At step S3, the ECU 44 (the camera information processor 74) determines whether or not both the left and right lane markings 112*l*, 112*r* are present based on the camera information Ic. In cases in which both the left and right lane markings 112*l*, 112*r* are present (S3: YES), processing proceeds to step S4. In cases in which only one of the left or right lane markings 112*l*, 112*r* is present, the outcome of step S3 is NO (false).

At step S4, the ECU 44 (the leading vehicle recognition section 60) computes the inter-vehicle distance Lv between the vehicle 10 and the leading vehicle 102. At step S5, the ECU 44 (the leading vehicle recognition section 60) determines whether or not the inter-vehicle distance Lv between the vehicle 10 and the leading vehicle 102 is within a specific range. Here, the specific range is set, for example, to match a range in which the detection precision of the camera 40 and the radar 42 is high. In cases in which the inter-vehicle distance Lv is within the specific range (S5: YES), processing proceeds to step S6.

At step S6, the ECU 44 (the lane marking recognition section 62) computes the distance W1 between the left and right lane markings 112*l*, 112*r* (also referred to as a "lane width W1" below) (FIG. 2A). Here, the lane width W1 is a width direction distance at an identified point that is between the vehicle 10 and the leading vehicle 102 (for example, the control target position Ptar or the leading vehicle position Ply).

At step S7, the ECU 44 (the reliability determination section 76) sets three width discrepancy threshold values THdw and one width discrepancy total threshold value THdtotal (also referred to as a "total threshold value THdtotal" below) based on the lane width W1. The width discrepancy threshold values THdw are threshold values for permissible values of the width discrepancies Dw between the lane marking reference positions Preflm and the leading vehicle reference positions Preflv. In the present embodiment, the width discrepancy threshold values THdw and the total threshold value THdtotal increase as the lane width W1 increases. Note that the width discrepancy threshold values THdw and the total threshold value THdtotal may be fixed values.

In the present embodiment, the width discrepancy threshold values THdw are set for the three reference positions Pref1, Pref2, Pref3 corresponding to the vehicle position Phv, the control target position Ptar, and the leading vehicle position Ply (see the width discrepancies Dw1, Dw2, Dw3 of FIG. 2C). The size of the discrepancies Dw at each of the reference positions Pref changes with the order of curved lines (for example, second order curved lines, or third order curved lines) fitted to the lane markings 112*l*, 112*r*. Thus, the recognition precision of the lane markings 112*l*, 112*r* can be increased by setting a width discrepancy threshold value THdw for each reference position Pref1, Pref2, Pref3. However, the width discrepancy threshold values THdw may be the same value for each of the reference positions Pref1, Pref2, Pref3.

The width discrepancy total threshold value THdtotal is a threshold value for the permissible value of the total Dtotal of the discrepancies Dw1, Dw2, Dw3. The total Dtotal of the present embodiment is defined as the total value of the absolute values of the discrepancies Dw1, Dw2, Dw3. Alternatively, the total Dtotal may be the discrepancies Dw1, Dw2, Dw3 summed together with mixed signs being left as-is.

At step S8, the ECU 44 (the reliability determination section 76) computes the lane marking reference positions Preflm (Preflm1, Preflm2, Preflm3) at three places corresponding to the reference positions Pref1, Pref2, Pref3. The lane marking reference positions Preflm indicate coordinates in a direction (Y direction) orthogonal to the direction of travel (X direction). Moreover, the lane marking reference positions Preflm1, Preflm2, Preflm3 each represent a position at the current time.

At step S9, the ECU 44 (the reliability determination section 76) computes the leading vehicle reference positions Preflv (Preflv1, Preflv2, Preflv3) corresponding to the three reference positions Pref1, Pref2, Pref3. The leading vehicle reference positions Preflv indicate coordinates in the direction (Y direction) orthogonal to the direction of travel (X direction). The leading vehicle reference position Preflv3 is the current leading vehicle position Ply, and the ECU 44 computes the leading vehicle reference position Preflv3 based on the current position of the leading vehicle 102. The ECU 44 identifies the leading vehicle reference positions Preflv1, Preflv2 from the stored driving course Lt of the leading vehicle 102.

At step S10, the ECU 44 (the reliability determination section 76) computes the width direction discrepancies Dw (Dw1, Dw2, Dw3) for the respective reference positions Pref1, Pref2, Pref3 (see FIG. 2C). At step S11, the ECU 44 (the reliability determination section 76) computes the total Dtotal of the discrepancies Dw. As described above, the discrepancy total Dtotal of the present embodiment is the sum of the absolute values of the respective discrepancies Dw (Dtotal=|Dw1|+|Dw2|+|Dw3|).

At step S12, the ECU 44 (the reliability determination section 76) determines whether or not each of the discrepancies Dw (Dw1, Dw2, Dw3) is below its width discrepancy threshold value THdw. In cases in which each of the discrepancies Dw is below its width discrepancy threshold value THdw (S12: YES), processing proceeds to step S13 since the reliability Dc of the lane markings 112l, 112r (or the driving lane 110) on the current occasion is considered high. Note that the determination of step S12 becomes NO (False) in cases in which any one of the discrepancies Dw is not below the width discrepancy threshold value THdw (S12: NO).

At step S13, the ECU 44 (the reliability determination section 76) determines whether or not the discrepancy total Dtotal is below the total threshold value THdtotal. The reliability Dc of the lane markings 112l, 112r (or the driving lane 110) on the current occasion is considered even higher in cases in which the discrepancy total Dtotal is below the total threshold value THdtotal (S13: YES). Thus, at step S14, the ECU 44 (the reliability determination section 76) confirms the lane markings 112l, 112r. In other words, the ECU 44 determines that the left and right lane markings 112l, 112r are a true pair of lane markings.

In cases in which the outcome of any out of steps S1 to S3, S5, S12, or S13 of FIG. 3 is NO (False), the ECU 44 executes error processing at step S15. In cases in which the leading vehicle 102 has not been detected (S1: NO or S2: NO), the ECU 44, for example, uses the lane markings 112l, 112r based on the camera 40 as-is. Alternatively, in cases in which any out of the width discrepancies Dw1, Dw2, Dw3 is not below the threshold value THdw (S12: NO) and in cases in which the width discrepancy total Dtotal is not below the threshold value THdtotal (S13: NO), the ECU 44, for example, corrects a lane marking reference position Prefln confirmed in the previous calculation cycle by the movement distance of the vehicle 10 up until the current calculation cycle, and employs the corrected marking reference position Prefln.

A2-3. Vehicle Control

The vehicle control controls operation of the vehicle 10 using the lane markings 112l, 112r recognized by the lane marking recognition control or the like. More specifically, in the vehicle control of the present embodiment, the driving assistance ECU 44 executes LKAS control and RDM control.

In LKAS control, the burden of driving is reduced by assisting steering operations so as to drive along a specific position of the driving lane 110 (for example, the center of the driving lane 110). During LKAS control, the ECU 44 outputs a steering angle instruction to the EPS ECU 34 such that the vehicle 10 drives along the specific position of the driving lane 110. LKAS control may be employed in combination with the automatic cruise control described above.

In the RDM control, when the vehicle 10 seems likely to depart from, or has departed from, the driving lane 110, the vehicle 10 is suppressed from departing from the driving lane 110 by controlling braking and steering. During RDM control, the ECU 44 outputs a braking instruction to the braking power ECU 32 and also outputs a steering angle instruction to the EPS ECU 34, in order to prevent departure from the driving lane 110.

A3. Advantageous Effects of Present Embodiment

As described above, according to the present embodiment, left and right lane markings 112l, 112r are determined as a true pair of lane markings 112l, 112r in cases in which the width direction discrepancies Dw between the reference positions Prefln between the left and right lane markings 112l, 112r, and the reference positions Preflv of the leading vehicle 102, are within the threshold values THdw, and the total Dtotal is within the threshold value THdtotal, (S12 to S14 of FIG. 3). Correct left and right pairs of lane markings 112l, 112r can therefore be recognized with high precision.

In the present embodiment, the lane marking recognition section 62 finds the width direction discrepancies Dw1, Dw2, Dw3 at the plural reference positions Pref1, Pref2, Pref3 along the direction of travel of the vehicle 10 (FIG. 2C, and S10 of FIG. 3). The lane marking recognition section 62 then determines that left and right lane markings 112l, 112r for which the width direction discrepancies Dw1, Dw2, Dw3 at the respective plural reference positions Pref1, Pref2, Pref3 are within the threshold value THdw, and the total Dtotal is within the threshold value THdtotal, are a true pair of lane markings 112l, 112r (S12, S14 of FIG. 3). This enables pairs of lane markings 112l, 112r to be recognized with high precision by using the width direction discrepancies Dw1, Dw2, Dw3 at the plural reference positions Pref1, Pref2, Pref3.

In the present embodiment, the lane marking recognition section 62 sets the width discrepancy threshold values THdw and the width discrepancy total threshold value THdtotal according to the lane width W1 (FIG. 2A), which is the distance between the left and right lane markings 112l, 112r (S7 of FIG. 3). This enables pairs of lane markings 112l, 112r to be recognized with high precision according to the lane width W1 defined by the left and right lane markings 112l, 112r.

B. Modified Example

Note that the present disclosure is not limited to the above embodiment, and it is obvious that various configurations can be obtained based on the contents of the present specification. For example, the following configuration may be applied.

B1. Applicability

In the embodiment above, the driving assistance system 12 is applied to the vehicle 10 (FIG. 1); however, there is no limitation thereto, and application may be made in other fields. For example, the driving assistance system 12 may be employed in a moving object such as an aircraft. Alternatively, the driving assistance system 12 may be applied in a robot. In such cases, a moving object ahead may be employed instead of the leading vehicle 102.

B2. Driving Assistance System 12 Configuration

In the embodiment above, the camera 40 (the camera information Ic) and the radar 42 (the radar information Ir)

are employed to detect the leading vehicle 102 (S1, S2 of FIG. 3). However, from the perspective of, for example, detecting the leading vehicle 102, there is no limitation thereto. For example, one out of the camera 40 or the radar 42 alone may be employed to detect the leading vehicle 102.

Moreover, in the embodiment above, the camera information Ic and the radar information Ir are employed separately when detecting the leading vehicle 102 (S1, S2 of FIG. 3). However, a combination of the two may be employed to detect the leading vehicle 102.

B3. Driving Assistance ECU 44 Control

In the examples of FIG. 2A to FIG. 2C, the lane markings 112*l*, 112*r* are envisaged as white lines on the road (continuous lines and intermittent lines). However, from the perspective of, for example, defining the driving lane 110, the lane markings 112*l*, 112*r* are not limited thereto. For example, the lane markings 112*l*, 112*r* may be yellow lines, Botts' dots, or cat's eyes. Alternatively, the lane markings 112*l*, 112*r* may be a guard rail itself or virtual markings set at a specific distance from a guard rail.

In the embodiment above, the width direction discrepancies Dw (Dw1 to Dw3) are computed for three reference positions Pref (Pref1 to Pref3) (S10 of FIG. 3). However, from the perspective of, for example, determining the reliability Dc of the lane markings 112*l*, 112*r*, there is no limitation thereto. For example, the number of reference positions Pref may be one, two, four, or greater. In such cases, reference positions Pref may be set to positions ahead of the leading vehicle 102.

In the embodiment above, comparison with the width direction discrepancies Dw (S12 of FIG. 3) and comparison with the width discrepancy total Dtotal (S13) are both performed. However, from the perspective of, for example, determining the reliability Dc of the lane markings 112*l*, 112*r*, there is no limitation thereto. For example, one out of comparison with the discrepancies Dw and comparison with the width discrepancy total Dtotal alone may be performed. Alternatively, comparison with an average value of the discrepancies Dw may be performed instead of comparison with the discrepancies Dw or comparison with the total Dtotal.

In the embodiment above, the lane marking reference position Prefln serving as a central position between the left and right lane markings 112*l*, 112*r* is compared with the leading vehicle reference position Preflv serving as the central position of the leading vehicle 102 to compute the width discrepancies Dw (S10 of FIG. 3). However, from the perspective of determining the reliability Dc of the lane markings 112*l*, 112*r*, there is no limitation thereto. For example, a position offset to the left side or right side from the central position between the left and right lane markings 112*l*, 112*r* by a specific distance may serve as the lane marking reference position Prefln, and a position offset to the left side or right side from the central position of the leading vehicle 102 by the specific distance may serve as the leading vehicle reference position Preflv. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle driving assistance device equipped with a vehicle comprising:
   a lane marking recognition section that recognizes left and right lane markings from a surroundings image captured by an imaging section; and
   a leading vehicle recognition section that recognizes a leading vehicle from the surroundings image,
   the lane marking recognition section includes a reliability determination section configured to determine reliability of the recognized left and right lane markings by determining whether a width direction discrepancy, or a value based on the discrepancy, between a first reference position located between a pair of the left and right lane markings and a second reference position of the leading vehicle is within a predetermined threshold value, and if so, determining that the pair of the left and right lane markings is a true lane marking pair.

2. The vehicle driving assistance device according to claim 1, wherein the lane marking recognition section:
   sets a plurality of discrepancy reference positions along a vehicle travel direction of the vehicle;
   finds the width direction discrepancy for each of the plurality of the discrepancy reference positions; and
   determines that the pair of the left and right lane markings is a true lane marking pair in cases in which the total or an average value of the width direction discrepancies, or each of the width direction discrepancies, is within the threshold value.

3. The vehicle driving assistance device according to claim 2 wherein the lane marking recognition section sets a different threshold value for each of the discrepancy reference positions.

4. The vehicle driving assistance device according to claim 2 wherein the lane marking recognition section sets a same threshold value for each of the discrepancy reference positions.

5. The vehicle driving assistance device according to claim 1, wherein the lane marking recognition section sets the threshold value according to the distance between the left and right lane markings.

6. The vehicle driving assistance device according to claim 5, wherein the lane marking recognition section increases the threshold value as the distance between the left and right lane markings becomes larger.

7. The vehicle driving assistance device according to claim 1, wherein the first reference position is set at a substantially middle point between the pair of the left and right lane markings, the second reference position is set at a substantial center of the leading vehicle, and the width direction discrepancy is a discrepancy in a lane width direction between the first and second reference positions.

8. The vehicle driving assistance device according to claim 2, further comprising a vehicle driving assistance section configured to assist driving of the vehicle such that the vehicle travels at a widthwise center between the recognized left and right lane markings,
   wherein the lane marking recognition section sets one of the plurality of discrepancy reference positions at a target location along the vehicle travel direction where the vehicle reaches the widthwise center between the recognized left and right lane markings according to guide by the vehicle driving assistance section.

9. A vehicle driving assistance device for a vehicle comprising:
- a lane marking recognition electronic control unit (ECU) that recognizes left and right lane markings on a lane from a surroundings image of the vehicle captured by an imaging device; and
- a leading vehicle recognition ECU that recognizes a leading vehicle on the lane from the surroundings image,
- the lane marking recognition ECU includes a reliability determination ECU configured to determine reliability of the recognized left and right lane markings by determining whether a lane width direction discrepancy, or a value based on the discrepancy, between a first reference position located between a pair of the left and right lane markings and a second reference position of the leading vehicle is within a predetermined threshold value, and if so, determining that the pair of the left and right lane markings is a true lane marking pair.

10. A vehicle comprising the vehicle driving assistance device for a vehicle according to claim 9.

11. The vehicle driving assistance device according to claim 9, wherein the lane marking recognition ECU:
- sets a plurality of discrepancy reference positions along a vehicle travel direction of the vehicle;
- finds the width direction discrepancy for each of the plurality of the discrepancy reference positions; and
- determines that the pair of the left and right lane markings is a true lane marking pair in cases in which the total or an average value of the width direction discrepancies, or each of the width direction discrepancies, is within the threshold value.

12. A vehicle driving assistance method for a vehicle comprising steps of:
- (i) recognizing, by a computer, left and right lane markings on a lane from a surroundings image of the vehicle captured by an imaging device; and
- (ii) recognizing, by the computer, a leading vehicle on the lane from the surroundings image,
- (iii) determining, by the computer, reliability of the recognized left and right lane markings by determining whether a lane width direction discrepancy, or a value based on the discrepancy, between a first reference position located between a pair of the left and right lane markings and a second reference position of the leading vehicle is within a predetermined threshold value, and if so, determining that the pair of the left and right lane markings is a true lane marking pair.

13. The vehicle driving assistance method according to claim 12, wherein the step (iii) further comprising:
- setting, by the computer, a plurality of discrepancy reference positions along a vehicle travel direction of the vehicle;
- finding, by the computer, the width direction discrepancy for each of the plurality of the discrepancy reference positions; and
- determining, by the computer, that the pair of the left and right lane markings is a true lane marking pair in cases in which the total or an average value of the width direction discrepancies, or each of the width direction discrepancies, is within the threshold value.

* * * * *